Jan. 24, 1967  W. C. JONES  3,299,923
EDGE STRAIGHTENING METHOD
Original Filed May 9, 1963  2 Sheets-Sheet 1
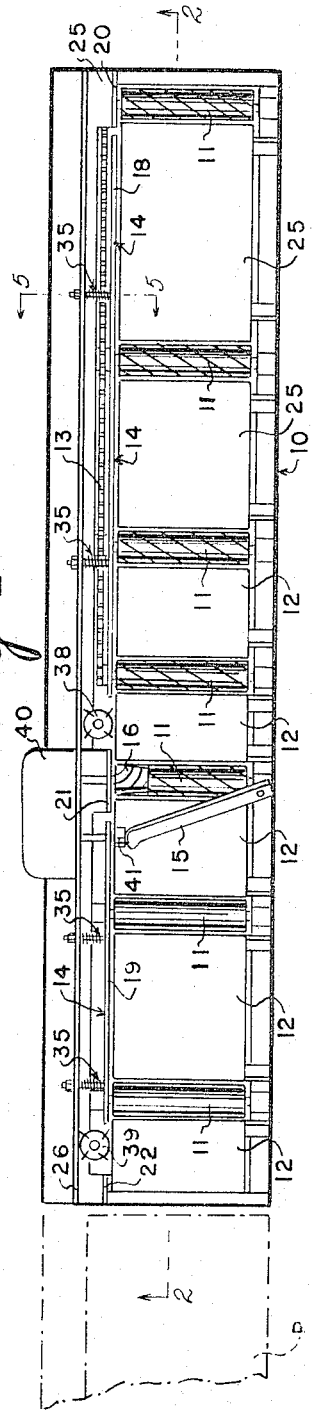
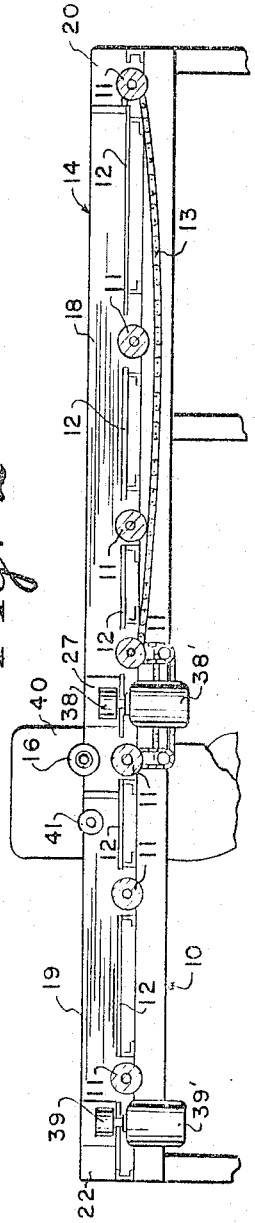
INVENTOR.
WILLIAM CARL JONES
BY
Newton, Hopkins,
Jones & Ormsby
ATTORNEYS

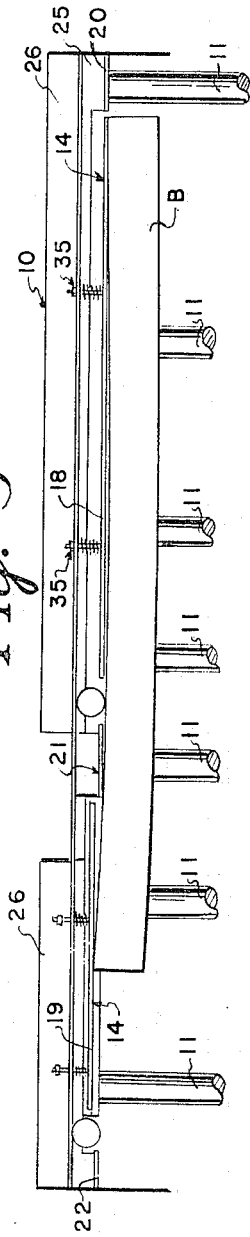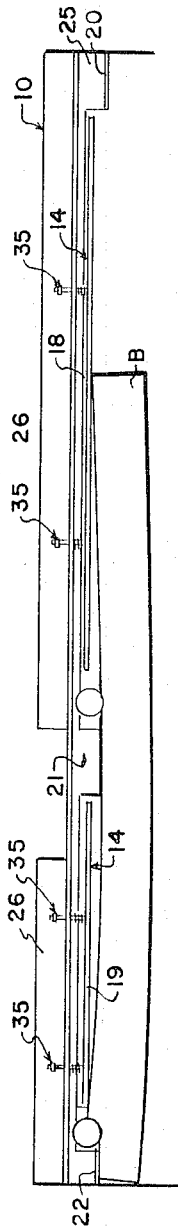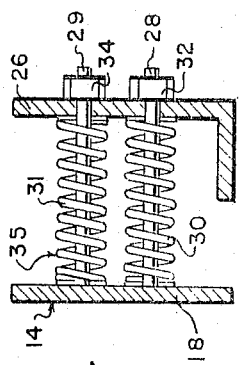

United States Patent Office 3,299,923
Patented Jan. 24, 1967

3,299,923
EDGE STRAIGHTENING METHOD
William Carl Jones, Nacogdoches, Tex., assignor of fifty percent to Temple Industries, Inc., a corporation of Texas
Original application May 9, 1963, Ser. No. 279,150, now Patent No. 3,211,197, dated Oct. 12, 1965. Divided and this application Feb. 10, 1965, Ser. No. 438,151
12 Claims. (Cl. 144—326)

The present application is a division of my copending application, Serial No. 279,150, filed May 9, 1963, now Patent No. 3,211,197, which was a continuation-in-part of my copending application Serial No. 140,179, filed September 20, 1961, and now abandoned.

This invention relates to a lumber dressing method, and is more particularly concerned with an edge straightening method to remove the bow from a board so that the board can be planed, or dressed, to be a straight board.

After lumber is sawed out, it is frequently allowed to sit for a period of time. During this time, some of the boards may become warped or bowed. The boards that become bowed are normally down graded, which causes them to sell for a lower price. Even with the usual planing operation to provide dressed lumber, the bow is not removed from the lumber because the board is guided by its edge; and if that edge be bowed or curved, the dressed lumber is bowed accordingly.

A device for use in practicing the present invention overcomes the above stated problem by providing, in combination with the standard planer feed table, a plurality of stationary guide walls. Between the stationary guide walls are movable walls. At the end of the movable walls are cutting means, the outer cutting surfaces of which are aligned with the stationary guide walls. Thus, portions of a bowed board will depress the movable walls and come into contact with the cutting means which cut off all portions of a board that deviate from a certain line.

It is therefore an object of the present invention to provide an edge straightening method for lumber that has become bowed.

It is another object of the present invention to provide an edge straightening method for lumber that will not affect boards having a straight edge.

Another object of the present invention is to provide a method of straightening the edge of a board.

Other and further objects, features and advantages of the present invention will become apparent from consideration of the following specification when taken in conjunction with the accompanying drawings in which:

FIG. 1 is a top plan view of a device constructed in accordance with the present invention.

FIG. 2 is a longitudinal cross sectional view taken substantially along the line 2—2 of FIG. 1.

FIG. 3 is a schematic view showing a bowed board before it contacts the cutters.

FIG. 4 is a view similar to FIG. 3 showing the board in contact with the cutters.

FIG. 5 is a cross sectional view taken substantially along the line 5—5 in FIG. 1.

In general terms the device of the present invention comprises means for holding portions of a board along a line while allowing other portions of the board to project past that line. Cutting means are provided, also on the line, and arranged to cut off all portions of the board that project past the line. This gives a straight edge on the board, aligned with the line.

Referring now more particularly to the drawings and to that embodiment here chosen by way of illustration, the device includes a table 10 having feed rollers 11 mounted transversely of the table and journalled for rotation about their axes. The rollers 11 are driven, as by a chain 13, from the housing 40. Plates 12 are mounted between the rollers 11 to provide a relatively solid table top to prevent the boards from passing down between the rollers 11.

At one side of the table 10 is a guide wall 14. The guide wall 14 is adjacent the ends of the feed rollers 11 so a board B can slide along the guide wall 14 and be carried along by the feed rollers 11. The guide wall 14 is perpendicular to the axis of the feed rollers 11; therefore, the travel of the boards is parallel to the guide wall 14.

Means are provided to urge the boards against the guide wall 14. In the embodiment here shown, two separate devices are used. An arm 15 is pivotally mounted on the table 10, and is spring urged to rotate in a clockwise direction as viewed in FIG. 1. It will thus be seen that the boards B will be pushed by the arm 15 toward the guide wall 14. Devices such as arm 15 are well known in the art, and are generally used on planer feed tables; therefore, no detailed description is deemed necessary.

In addition to the arm 15, there is a roller known as a pineapple roller to urge the boards against the guide wall 14. The pineapple roller 16 is a frustoconical roller having helical grooves in its surface. The pineapple roller 16 is driven so that the helical grooves urge the board toward the guide wall 14. The construction and operation of the pineapple roller is well known in the art and should be understood with the above description.

The guide wall 14 is made up of a plurality of sections, some being movable and some being stationary. In the embodiment here shown there are two movable sections including a rear movable section 18 and a front movable section 19. Three stationary sections alternate with the three movable sections. At the rearmost end (or the entrance end) is a stationary section 20; between the two movable sections 18 and 19 is a stationary section 21; and, at the forwardmost (or exit) end is a third stationary section 22.

Though the exact structure to provide the guide wall 14 may take various forms, in the embodiment here shown there is a channel shaped member having a central web 25, an outside arm providing a wall 26, and an inside arm providing the guide wall 14.

The stationary sections 20, 21 and 22 of the guide wall 14 are formed integrally with the channel member; and, the movable sections 18 and 19 are separate from the channel member and supported from the wall 26.

The supporting structure for the movable sections 18 and 19 is shown in detail in FIG. 5. A pair of bolts 28 and 29 is secured to the movable plate, as plate 18, by welding or the like. The bolts 28 and 29 project toward the inside of the channel member, passing through appropriate holes in the wall 26. Springs 30 and 31 surround the bolts 28 and 29 respectively between the wall 26 and the movable section 18 to urge the movable section 18 inwardly of the table 10. Nuts 32 and 34 threadably engage the bolts 28 and 29 respectively to limit the movement of the section 18. The nuts 32 and 34 should be adjusted so that the section 18 is normally aligned with the stationary sections 20, 21 and 22. A straight guide wall 14 is thereby provided.

It will thus be seen that the movable section 18 can be depressed by overcoming the tension of the springs 30 and 31; but, the return movement is limited by the nuts 32 and 34. While one particular support has been described, it will be understood that a plurality of such supports is used on both section 18 and section 19. The supports, as the one shown in FIG. 5, are generally designated at 35.

In FIGS. 1 and 2 it will be seen that the movable sections 18 and 19 do not extend entirely to the succeeding stationary sections 21 and 22 respectively; rather, there is a space between movable section 18 and stationary section 21 and between movable section 19 and stationary section 22. Behind the spaces mentioned, there are cutting means 38 and 39. The cutting means 38 and 39 are here shown as circular cutting heads such as are ordinarily used in various planing or joining machines; however, it should be realized that numerous cutting devices can be used, such as circular saws, band saws or the like. Motors 38' and 39' are mounted below the top of the table 10 and carry the cutting heads 38 and 39 directly on their shafts.

About in the center of the table 10, there is a housing 40 which contains a conventional driving means. A shaft from the housing 40 supports the pineapple roller 16 above described. Another shaft from the housing 40 carries an outfeed roller 41. The outfeed roller 41 is mounted on the forward side of the pineapple roller and is spaced upward from the feed rollers 11 a distance approximately equal to the thickness of boards being run through the machine. The purpose of the outfeed roller 41 will be discussed later.

In operation, a curved or bowed board is placed on the table 10 with the concave side of the board adjacent the wall 14. Henceforth, a better understanding will be had by referring to FIGS. 3 and 4 of the drawings.

As the board B travels along the table 10, carried by the rollers 11, the board is engaged by the pineapple roller 16 which urges the board B toward the wall 14. As the board moves on, the arm 15 also engages the board B to help to keep the board against the guide wall 14; then, the outfeed roller 41 engages the board. Since the board is now pushed firmly against the wall 14, there will be a considerable amount of frictional drag; and the roller 41 aids in driving against that drag. Also, the board will soon engage the cutting means, causing additional drag which must be overcome.

Initially, the board B will ride on the stationary sections 20 and 21 which will keep the board away from the cutting means; however, when the board is positioned so that the apex of the concavity is centered on the middle stationary section 22, the outwardly projecting ends of the board will depress the movable sections 18 and 19 of the guide wall 14. Now, as the board moves on, the rear cutter head 38 will engage the board close to the mid-section of the board and cut off that portion of the board which projects past the guide wall 14. Later, after the board has moved further, the forward end of the board will engage the cutter head 39 which will cut off that portion of the board projecting past the guide wall 14.

As mentioned above, the extremities of the cutting heads are aligned with the stationary sections of the guide wall 14; hence, the portions of the board that project past the wall 14 will be cut off even with the wall 14. This gives a straight edge on one side of the board. This straight edge can now be fed through to the planer P where the board is guided by the straight edge and planed accordingly.

From the above description it should be realized that the movable sections 18 and 19 of the guide wall 14 serve only to aid in positioning the board B on the stationary section 22 of the guide wall 14. It is this positioning that is essential to the proper operation of the device, and other guide portions assist only in attaining this positioning of the board.

When the board engages the rear cutter 38, the load on the cutter is gradual because the cutter first engages the board close to the apex of the curve. When the board engages the forward cutter 39, on the other hand, the end of the board engages the cutter with the maximum amount of material to be cut first. In view of this difference in loading of the cutters, the motor 39' driving the forward cutter 39 should be larger than the motor 38' driving the rear cutter 38. In one successful embodiment of the invention, the forward motor is a 15 horsepower electric motor, whereas the rear motor is only a 10 horsepower electric motor. The extra horsepower is required to absorb the shock of sudden loading of the cutter as discussed above.

It will thus be seen that the device of the present invention provides a simple and efficient means for reducing or removing the bow in a board. The device can be used in conjunction with the usual planing equipment, or can be used apart from such equipment.

It will of course be understood that the device presented is by way of illustration only, and is meant to be in no way restrictive; therefore, numerous changes and modifications may be made, and the full use of equivalents resorted to without departing from the spirit or scope of the invention as outlined in the appended claims.

I claim:
1. The method of removing the bow from a board including the steps of placing the concave portion of the board against a guide wall, urging said board toward said guide wall until the apex of said concave portion abuts said guide wall, and cutting off portions of said board that project past said guide wall.

2. A method of feeding a piece of lumber having a concave edge into a planer with the concave edge substantially straightened, said method comprising the steps of feeding the piece of lumber toward the planer with said edge moving adjacent a line of reference extending into the planer, urging the piece of lumber laterally toward said line of reference as the piece of lumber is fed toward the planer, restricting the lateral motion of the piece of lumber when a portion of said edge extends beyond the line of reference, and cutting said piece of lumber along said line of reference.

3. The continuous method of removing the bow from a board including the steps of placing the concave portion of the board against a guide line, continuously moving said board along the guide line, urging said board toward said guide line, cutting off the portions of said board that project past said guide line thereby providing a substantially straight edge along one side of the board, and continuing the movement of the board along said guide line while feeding the board through the planer with the straight edge of the board aligned with such guide line.

4. The method of straightening the concave side of a bowed board including the steps of placing the concave portion of the board adjacent a guide wall, longitudinally moving said board parallel to the guide wall, transversely pressing one portion of the board toward the guide wall, preventing the portion of the board being pressed from extending across said guide wall, yieldably allowing the portion of the board spaced from the point of transverse pressure to extend across the guide wall in proportion to the amount of bow in the board, and cutting off the portions of said board that project past said guide wall thereby straightening the concave side of said board.

5. The method of straightening the concave side of a bowed board including the steps of placing the concave portion of the board adjacent a guide wall, longitudinally moving said board parallel to the guide wall, transversely pressing the board toward said guide wall at one position along said guide wall, at the point of transversely pressing said board preventing the portion of the board being pressed from extending across said guide wall, yieldably allowing portions of the board spaced from and on both sides of the point of transverse pressure to extend across the guide wall, and cutting off the portions of said board that project past said guide wall thereby straightening the concave side of the board.

6. The method of straightening the concave side of a bowed board including the steps of placing the concave portion of the board adjacent a guide wall, longitudinally moving said board parallel to but normally preventing said board from extending across said guide wall, at one position along said guide wall transversely pressing a portion of said board toward said guide wall, yieldably allowing portions of the concave side of the board spaced from said one position to extend across the guide wall, and cutting off the portions of said board that project past said guide wall thereby reducing the bow in the concave side of the board.

7. The method of claim 6 wherein the board is cut off along said guide wall at a point upstream from said one position.

8. The method of claim 6 wherein the board is cut off along said guide wall at a point downstream from said one position.

9. The method of straightening the concave side of a bowed board including the steps of placing the concave side of the board adjacent a guide wall, longitudinally moving said board parallel to but normally preventing said board from extending across said guide wall, at one position along said guide wall rigidly preventing said board from extending across the guide wall, at one position along said guide wall laterally pressing the board against said guide wall, yieldably allowing portions of the concave side of the board spaced from said one position to extend in proportion to the amount of bow in the board across the guide wall, and cutting off the portions of said board that project past said guide wall thereby reducing the bow in the concave side of the board.

10. The method of straightening the concave side of a bowed board including the steps of placing the concave side of the board adjacent a guide wall, longitudinally moving said board along but normally preventing said board from extending across said guide wall, at a first position along said guide wall pressing a portion of said board toward said guide wall, at said first position preventing said pressed portion from extending across said guide wall, at a second position along said guide wall upstream from said first position preventing said board from extending across said guide wall, between said first and second positions yieldably allowing portions of the concave side of said board to extend across the guide wall in proportion to the amount of bow in the board, and cutting off the portions of said board that project past said guide wall thereby reducing the bow in the concave side of the board.

11. The method of straightening the concave side of a bowed board including the steps of:

placing the concave side of the board adjacent a guide wall,
longitudinally moving said board parallel to the guide wall,
transversely pressing the board at one position along the guide wall toward the guide wall,
preventing the portion of said board at said one position from being pressed across the guide wall, but allowing portions of the board spaced from said one position to extend across the guide wall in proportion to the amount of bow in the board,
cutting off at a position downstream of said one position portions of said board that project past said guide wall, and
at a second position along said guide wall downstream of said cutting position preventing a portion of said board at the second position from extending across said guide wall.

12. The method of straightening the concave side of a board including the steps of:

placing the concave side of the board adjacent a guide wall,
longitudinally moving said board parallel to the guide wall and simultaneously keeping the board from extending across the guide wall until the leading edge of the board reaches a first position along the guide wall,
at said first position transversely pressing said board against the guide wall,
preventing said board being pressed from extending across said guide wall at said one position, but allowing portions of the board upstream from said first position to extend across the guide wall in proportion to the amount of bow in the board, and
at a point upstream from said one position cutting off only portions of the board that extend past said guide wall.

References Cited by the Examiner

UNITED STATES PATENTS 2,998,038  8/1961  Oller _____ 144—116

FOREIGN PATENTS 371,489  3/1923  Germany.

WILLIAM W. DYER, Jr., *Primary Examiner.*

R. ZLOTNIK, *Assistant Examiner.*